United States Patent [19]
Berg

[11] 3,899,806
[45] Aug. 19, 1975

[54] SAFETY HOOK
[75] Inventor: Bengt Frans Allan Berg, Gemla, Sweden
[73] Assignee: K A Bergs Smide AB, Gemla, Sweden
[22] Filed: Sept. 27, 1973
[21] Appl. No.: 401,359

[30] Foreign Application Priority Data
Oct. 25, 1972 Sweden............................. 13761/72
Mar. 13, 1973 Sweden............................. 7334/73

[52] U.S. Cl. ................................. 24/241 PL; 294/83 R
[51] Int. Cl.² .......................... B64D 17/38; A44B 13/00
[58] Field of Search ....... 294/82 R, 83 R; 24/241 R, 24/232–235, 238, 239, 241 CH

[56] References Cited
UNITED STATES PATENTS
| | | | |
|---|---|---|---|
| 292,008 | 1/1884 | Hart................... | 24/239 UX |
| 714,777 | 12/1902 | Buck................... | 24/232 X |
| 1,392,026 | 9/1921 | Stevenson............ | 24/241 SL |
| 1,842,593 | 1/1932 | Edwards.............. | 24/241 P |
| 2,783,518 | 3/1957 | Anderson............. | 24/241 PL |
| 2,791,817 | 5/1957 | Burnham.............. | 24/241 PL |

FOREIGN PATENTS OR APPLICATIONS
714,447  7/1965  Canada............................. 294/83 R Primary Examiner—Donald A. Griffin
Attorney, Agent, or Firm—Hubbell, Cohen, and Stiefel

[57] ABSTRACT

A load, traction or similar hook of the safety type has at least one member which has a locking position in which it wholly or partly blocks the interspace between the hook tip and the opposing hook shank or corresponding member. The safety latch is rotatable on an axis which is located substantially in a median plane through the tip and the shank of the hook and is simultaneously axially displaceable along the same axis. The safety latch has an inclined end surface which cooperates with a mating, correspondingly inclined cam surface. The safety latch is biased towards and maintained in a neutral position by a compression spring which maintains said mating surfaces in engagement with each other.

15 Claims, 7 Drawing Figures

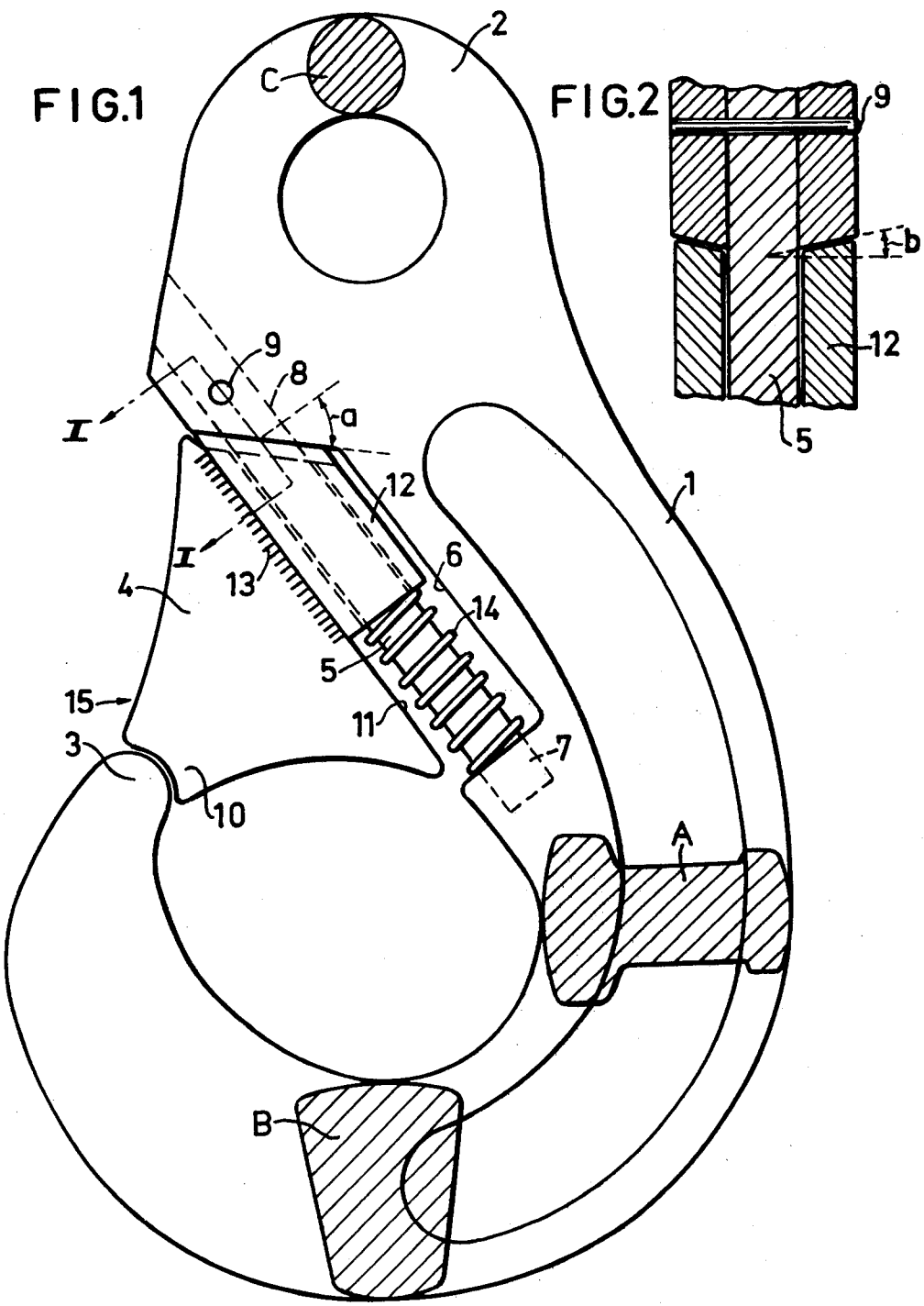

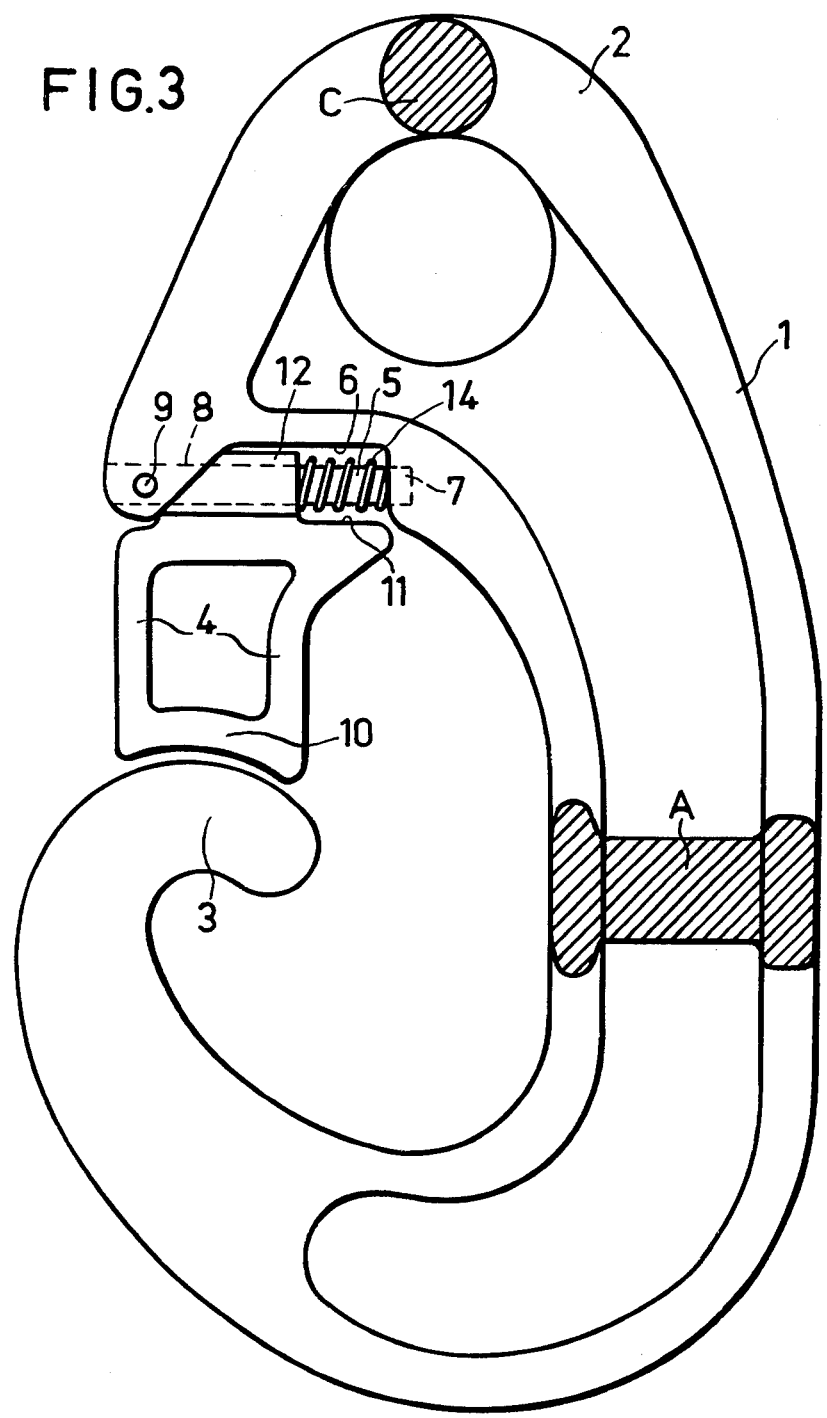

SAFETY HOOK

This invention relates generally to such load, traction or similar hooks as have flexibly resilient means, which in some cases, e.g. is lockable on account of its shape ("form-lockable") and herein-below is called safety latch and which in its locking position wholly or partly blocks the interspace ("throat") between the hook tip and the opposing hook shank or corresponding member.

Such hooks are generally denominated safety hooks and are well-known for a long time. The common feature of such safety hooks of the kind here referred to which have been used in practice resides in the fact that the safety latch, both when it has been formed as a shackle or bolt and when it has been formed in another way, has been turnable and/or displaceable substantially in the median plane through hook tip and hook shank. This usually means that a latch which is easy to open has been difficult to lock, and conversely. In addition thereto, in the case of a load hook, undesirable opening forces usually appear during hoisting or lowering of the load, and these forces are in most cases directed parallel to the median plane.

The object of the invention is to provide a new type of safety hook of the above kind in which, among other things, forces which act upon the safety latch and are directed substantially parallel to the median plane, do not bring about an unintentional opening of the safety latch.

Another object of the invention is to provide a very robust and reliable load hook of the safety type having a self-locking, easily opened latch means which, as far as possible, is uninfluenceable by soiling, ice-covering or wear.

According to the invention this is achieved substantially by providing at least one safety latch, which in its locking position wholly or partly blocks the interspace between the hook tip and the opposing hook shank and is rotatable to its open position on an axis, which is located substantially in a sectional plane through the tip and the shank of the hook, preferably parallel to the hook shank or the corresponding member which is opposite the hook tip.

It has turned out, however, that such safety hooks with only one safety latch can be less reliable in some cases, i.e. when either a very thick or a very thin wire is utilized. Thus, a very thick wire may, at the last stage of the lowering of a heavy load, when the load engages a support and the load on the wire ceases, tend to warp and in so doing possibly press the safety latch sidewards from the inner side of the throat of the hook, which gives rise to a risk for disengagement of the wire loop from the hook.

On the other hand, a very thin wire may possibly at hoistening, before it becomes loaded, penetrate into the interspace between the hook tip and the safety latch. For several reasons it is not possible to avoid this by making the safety latch form a tangent to the hook tip without any interspace, this from the points of view of manufacture as well as of use.

To overcome such problems it is proposed, according to a further development of the invention, that two substantially similar safety latches, which resiliently engage the hook tip from opposite directions in the closed position, are provided in a hook of the kind referred to above.

It is self-explanatory and clearly evident from the following description that the invention does not presuppose any exact parallelism between the pivot axis of the safety latch(es) and the hook shank, and that the essential feature resides in the mounting or suspension of the safety latch in a swing-door fashion.

These and further features of the invention and the advantages associated therewith will become apparent from the following description, claims and drawings.

The invention will now be more particularly described, reference being made to the annexed drawings, which illustrate the principal features of some exemplifying, preferred embodiments of the invention and in which FIG. 1 is a side elevational view of a load hook according to the invention;

FIG. 2 is a sectional view on the line I — I in FIG. 1 illustrating the area surrounding the guide surfaces on a larger scale;

FIG. 3 is a side elevational view of a modified hook according to FIG. 1;

Figure 4:
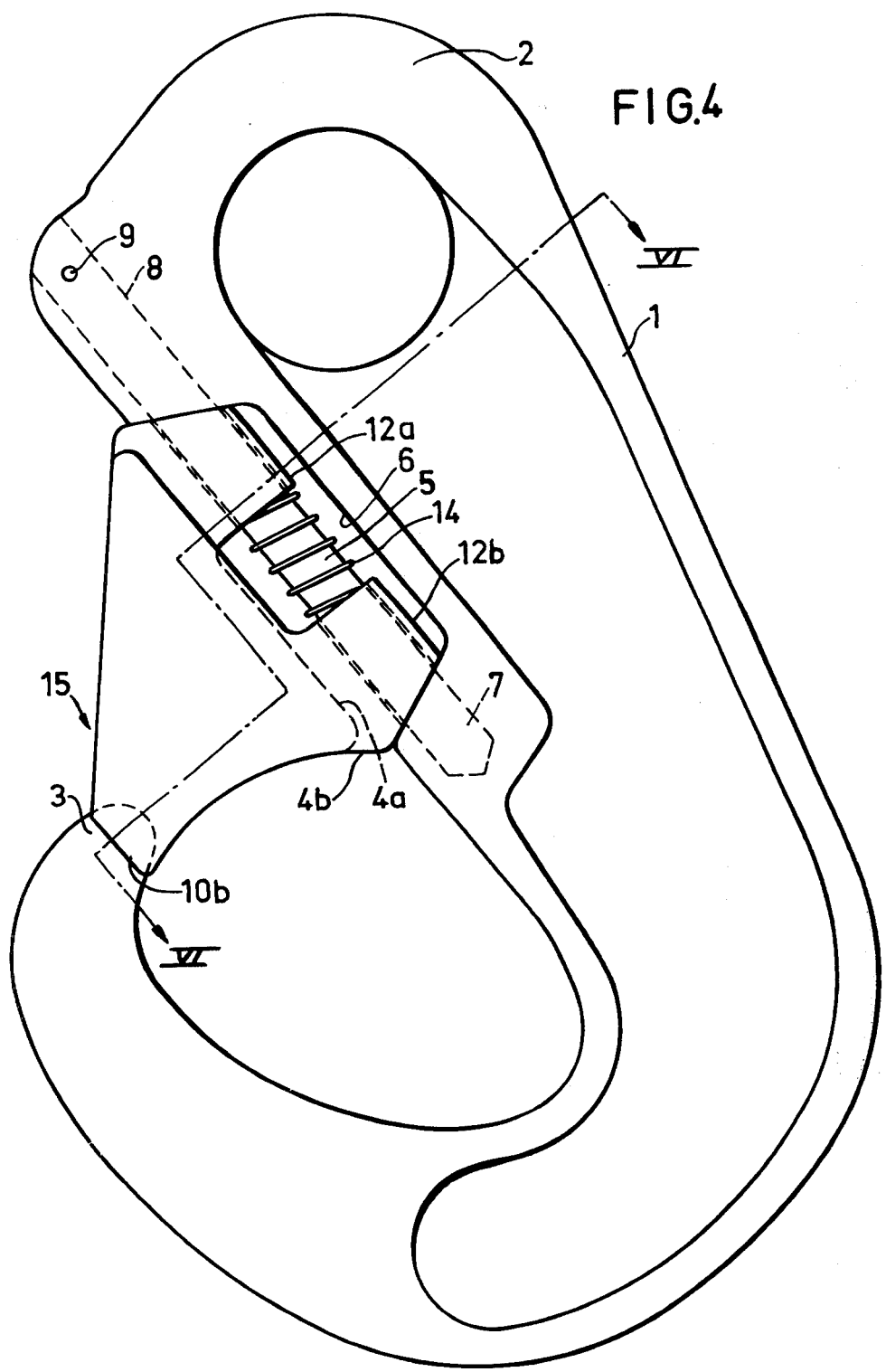
FIG. 4 is a side elevational view of another modification of the invention and illustrates a safety hook having two safety latches.

The load hook according to FIG. 1 is of conventional construction, and the deviations in form and dimensions are due to the special design of the safety latch or latches according to the invention.

Accordingly, the load hook according to the embodiment of the invention illustrated in FIGS. 1–2 comprises a load carrying shank 1 which has its free connection end provided with an eye 2 for a wire or the like and its other end formed to a hook tip 3. In the usual way the cross sections of the load hook are dimensioned in dependence of the load, and some different cross sectional areas A in the shank, B in the transition from the shank 1 to the hook tip 3 and C in the free connection end of the hook are shown as hatched surfaces in FIG. 1.

Load hooks of this kind are usually secured against disengagement of the chain, wire or corresponding means, which is introduced through the throat 15 between the shank 1 and the hook tip 3 by providing a latch which blocks the interspace between the hook tip and the shank located inside thereof, wholly or in part. The novel feature of the invention resides therein, that the latch means 4, which in the embodiment roughly may be considered as having the shape of a triangular leaf or flap, is pivotable on a shaft 5 on the inner side of the upper portion of the shank 1, to which it is substantially parallel. In the inner edge of the shank 1 there is provided a recess 6. In the lower one of the two shorter sides of the recess 6 there is provided a blind, cylindrical hole 7, and in the upper one there is provided a through hole 8; these holes being coaxial. The opposite ends of the shaft 5 extend into the respective holes, and in this embodiment the shaft is maintained in place by a radial pin or rivet 9, preferably in such a way that the pin or rivet may be removed for repair of the latch system of the hook.

The outer corner or end 10 of the latch means 4 has a shape which substantially corresponds to the outer end of the hook tip 3, and the opposite, inner side 11 of the latch means 4 has substantially the same length as the recess 6.

To the upper edge of the side 11 there is secured a cylindrical sleeve 12 in a suitable way, e.g. by means of a weld 13. The sleeve 12 is journalled on the shaft 5 and is resiliently urged upwards, towards its blocking position, by a helical spring 14 which is operative between the lower edge of the sleeve 12 and the lower short side of the recess 6.

The manufacture of the hook is suitably carried out in such a way that the hook forging is made by forging, after which the hole 8 and the blind hole 7 are bored, and finally the aperture for the pin or rivet 9 is bored. After that the hook is toughened in the usual way. The latch 4, however, is suitably case-hardened together with the sleeve 12 after their forming and welding together. Of course, the sleeve and the latch may be manufactured in one piece.

If there are risks of soiling by particularly hard, granular material, such as gravel or the like, it is desirable to protect the spring by enclosing it or moulding it in a suitable rubberlike artificial material. In such cases it is also possible to impregnate, or in another way introduce oil into, the spring unit in such a way that the wear surfaces between the sleeve and the tapered end of the recess are lubricated through the slot between the sleeve 12 and the shaft 5.

The upper end of the sleeve 12 is, as is apparent from FIG. 1, cut off obliquely in such a way, that the angle $a$ will be in the order of 45° and that the surface portion of the recess 6 which cooperates with the upper end of the sleeve 12, has a corresponding inclination. If the spring 14 urges the sleeve 12 upwards with a comparatively great force, this may be sufficient in itself for maintaining the sleeve, and accordingly the latch 4, form-locked in locking position. To improve the maintenance of the members in the locking position, one can suitably make the upper end of the sleeve 12 slightly V-shaped bevelled in such a way that the apex angle ($180°-2b$) becomes about 160° (angle $b$ ranges from about 5° to about 15° and is preferably 10°), as in the embodiment and as is most clearly shown in FIG. 2, and of course the upper short side of the recess 6 is given a corresponding shape. Of course, the same result may be achieved in many of other ways known per se, which are also within the scope of the present application. It has to be born in mind that independent of the solution chosen to obtain maintenance of the locking position, the risk of soiling, e.g. from load goods, wear and such factors as ice-formation and the like, have to be considered, so that one picks that solution which affords a reliable, robust construction.

In the exemplifying embodiment described above that end or corner 10 of the latch 4, which cooperates with the hook tip 3, is shaped for a certain form-locking against forces, which in this case are directed straight downwards, i.e. forces which by themselves do not tend to rotate the latch but only to press it inwards, against the spring force. It is self-evident that this form-locking could be made substantially more "effective" but in many cases at the cost of durability and reliability.

For example, a groove and a guide pin in the sleeve 12 respectively, in combination with a corresponding guide pin and a groove in the recess 6 respectively, could provide a rigid form-locking until the latch has been displaced a certain distance against the influence of the spring 14. In the embodiment described, however, one has to sacrifice the illustrated form-locking with the hook tip, which does not permit such axial displacement without simultaneous rotation.

It is also unimportant per se if the latch 4, as in the embodiment according to FIG. 1, is displaced axially downwards at the opening of the latch, or if the spring 14 is provided at the upper end and the inclined or oblique guide surfaces are located at the lower end, so that the latch 4 is displaced upwards, as seen in the axial direction, at the opening of the latch.

It is also possible to arrange the pivot shaft 5 of the safety latch 4 horizontally, as illustrated in FIG. 3 which is a side elevational view on a smaller scale of a modification of the safety hook according to FIGS. 1 and 2 and in which the same reference numerals as in these Figures have been used to designate like or corresponding members. The hook according to FIG. 3 is primarily intended for heavy loads.

FIGS. 4 – 7 illustrate three further embodiments of the invention which are all provided with two safety latches. In these Figures the same reference numerals as in FIG. 1 with the addition of suffixes $a$, $b$ have been utilized to designate like or corresponding members.

The hooks according to these embodiments are intended to be utilized where the hooks are expected to be used in connection with particularly thin or particularly thick wires, as stated above.

Figure 6:
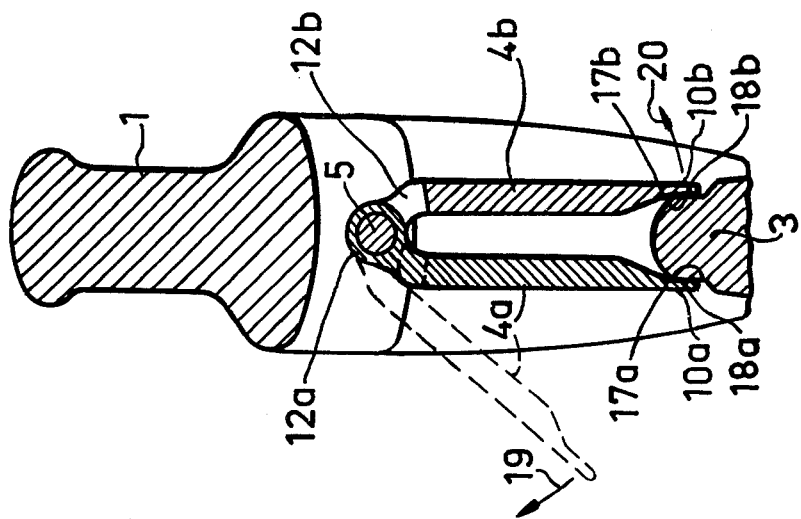
FIG. 6 is a cross sectional view on a smaller scale substantially along the line VI — VI in FIGS. 4 and 5.

The hook according to FIGS. 4 and 6 comprises two safety latches 4a, 4b each having a sleeve portion 12a and 12b respectively. These sleeve portions are arranged coaxially, after each other on the shaft 5. The helical spring 14 is provided on the shaft 5 between the sleeve portions 12a and 12b and has its respective ends in engagement with two opposing end surfaces of the sleeve portions 12a and 12b respectively. Each of the other, outer end surfaces of the sleeves 12a, 12b is inclined and engages a corresponding, similarly inclined end surface of the recess 6 in the inner side of the shank 1, in the same way as described above in connection with FIGS. 1 – 2.

The free ends or corners 10a, 10b of the two safety latches 4a, 4b respectively are shaped in such a manner that they overlap and resiliently engage the hook tip 3 from opposite sides. The hook tip 3 and/or the respective end portions 10a, 10b of the safety latches 4a, 4b may suitably be provided with cooperating surfaces, e.g. in the way, that the hook tip 3 has plane lateral portions 17a, 17b, which are abutted by plane end portions 18a, 18b of the respective safety latches 4a, 4b.

As is evident from FIGS. 4 and 6 a wire or the like may be fastened to the safety hook according to this embodiment of the invention through the turning of one of the latches 4a, 4b on the shaft 5 in the direction of the arrow 19 or 20 respectively and subsequently turning the remaining latch 4b or 4a in the direction of the arrow 20 or 19 respectively. The first rotation of any of the latches 4a, 4b has as a rule to be carried out by hand, whereas the subsequent rotation of the remaining latch may be brought about by pressing the wire or the like against the latch.

As in the embodiment according to FIGS. 1 – 2 the safety latches 4a, 4b are spring biased towards their closed positions, by means of the helical spring 14.

Figure 5:
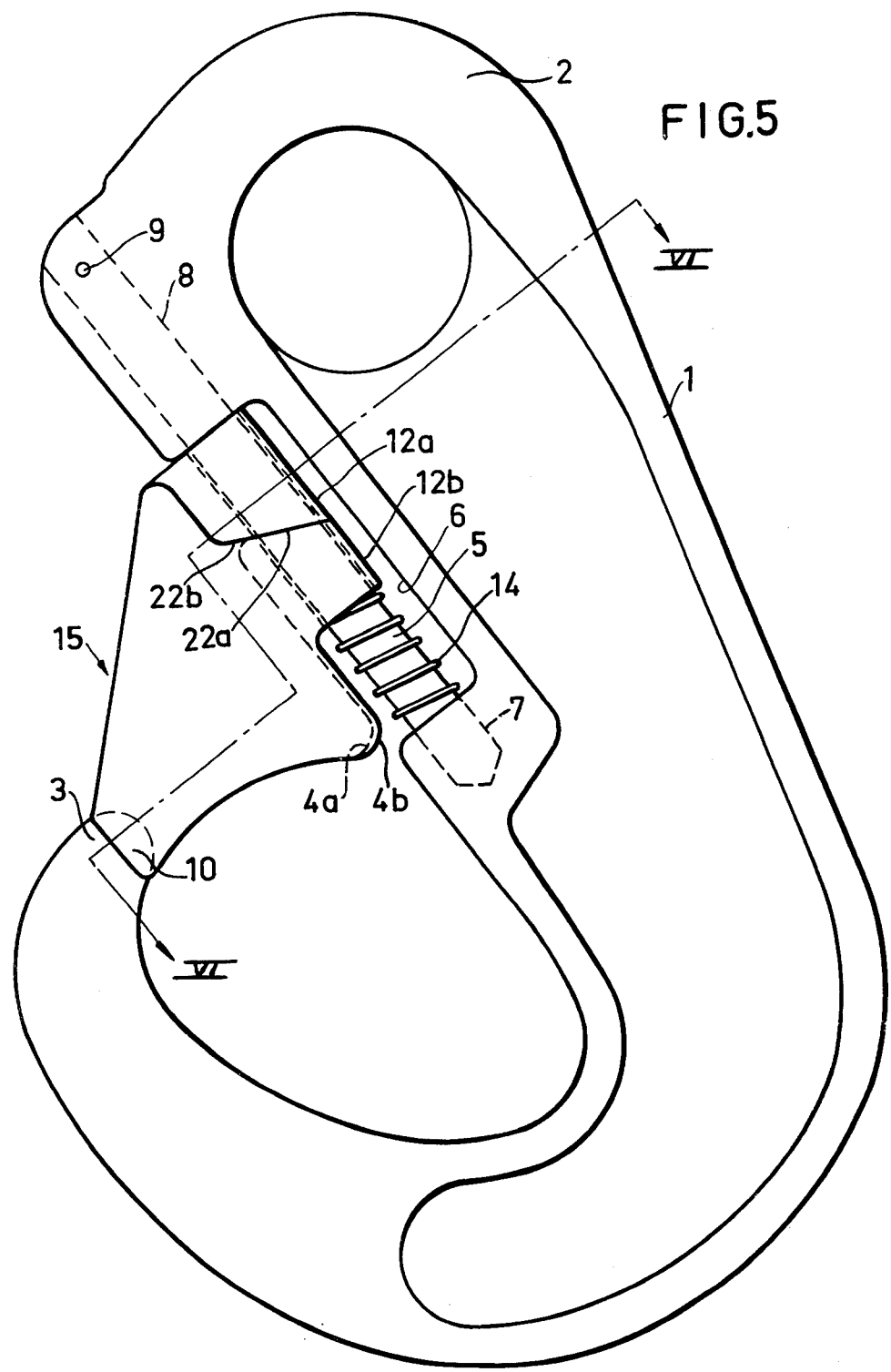
FIG. 5 is similar to FIG. 4 showing still a further modification of the hook of FIG. 4.

According to FIGS. 5 and 6 the latches 4a, 4b are journalled on the same shaft 5 as in FIG. 4. As shown in FIG. 5 the sleeve portion 12a of the latch 4a has an inclined lower end surface 22a, while the sleeve portion 12b of the other safety latch 4b has a substantially similar inclined surface 22b, which cooperates with said corresponding inclined surface 22a on the sleeve portion of the first-mentioned latch 4a in such a way that both latches by means of their common compression spring 14 are maintained pressed towards the closed position by force locking and/or form locking. Alternatively, a (supplementary) torsion spring not shown may be adapted to actuate one latch in one direction with its one end and to actuate the other latch in the opposite direction with its other end.

Figure 7:
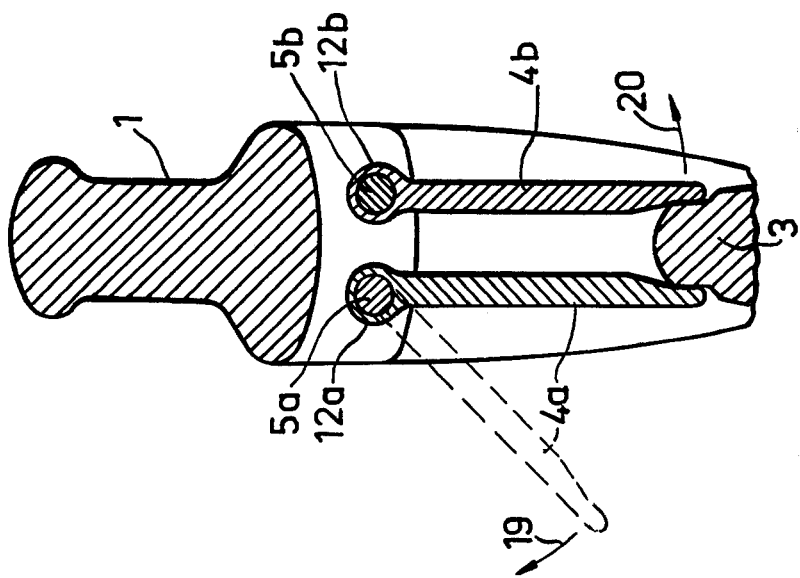
FIG. 7 is a cross sectional view corresponding to FIG. 6 of a further modification of the safety hook according to FIG. 4.

As is evident from FIG. 7 which is a cross sectional view corresponding to FIG. 6 it is also possible to journal the sleeve portions 12a, 12b of the safety latches 4a and 4b respectively on individual shafts 5a, 5b respectively. Of course, each safety latch sleeve portion has its own compression spring and inclined end surface (not shown) which cooperates with a corresponding, associated inclined surface at one end of the recess 6 in the manner described in connection with any of FIGS. 1, 2 and 4.

It is self-evident that the invention is not restricted to the embodiments described above and illustrated in the drawings but may be modified in several ways within the scope of the following claims. Thus new embodiments may be created by combining details taken from different ones of the embodiments according to the above disclosure. Furthermore the invention is not restricted to safety hooks, but may be applied e.g. to traction hooks and similar hooks, swivel hooks, coupling links or the like. For such objects it may be necessary for statutory reasons or the like to provide the hook with some additional form-locking, which is known per se or particularly adapted to the hook design in question, without therefore departing from the spirit and scope of the invention as defined by the following claims.

What I claim is:

1. A hook having a normal vertical axis when freely suspended, said hook comprising a suspension end portion, a hook tip, and an arcuate hook shank which connects said suspension end portion with said hook tip and defines a median plane through said suspension end portion and said hook tip; said suspension end portion, said hook tip and a portion of said shank defining a throat through which attachment means can be introduced and brought into engagement with said hook; at least one safety latch means pivotally mounted for movement about an axis which forms a substantial angle with said normal vertical axis of said hook, said pivotal axis being located substantially in said median plane, said safety latch member being pivotally movable between a first stable position in which it blocks said throat and a second position out of blocking relation with said throat; and resilient means for urging said safety latch member to its first stable position.

2. A hook according to claim 1, in which said two points on the hook are located on the suspension end and shank side of the throat.

3. A hook according to claim 1, in which said resilient means is a helical spring which surrounds the pivotal axis of said safety latch member.

4. A hook according to claim 3, in which said helical spring is a compression spring.

5. A hook according to claim 4, in which said safety latch member is axially displaceable against the opposing force of the spring in addition to being pivotable or rotatable on said axis.

6. A hook according to claim 5, wherein one axial end of each of said safety latch members is provided with a first inclined cam surface which forms an acute angle with said axis and is in abutting relationship with the first-mentioned cam surface; said spring resiliently pressing said cam surfaces against each other.

7. A hook according to claim 5, in which the respective contours of said first and second cam surfaces are convex and concave, respectively, as seen in a sectional plane, which is perpendicular to said cam surfaces.

8. A hook according to claim 7, wherein the two latch members are pivoted on individual pivot axes.

9. A hook according to claim 7, wherein said safety latch members resiliently engage said hook tip from mutually opposite directions when occupying their respectively stable positions.

10. A hook according to claim 5, in which said safety latch member has a portion which faces said hook tip and has a shape which corresponds to the shape of the hook tip, whereby the safety latch member is substantially undisplaceable in the axial direction unless simultaneously rotated or pivoted on said axis.

11. A hook according to claim 3, in which said helical spring is a torsion spring.

12. A hook according to claim 1, wherein the number of safety latch members is two.

13. A hook according to claim 12, wherein said two safety latch members have common rotational axis.

14. A hook according to claim 12, wherein one of said cam surfaces is the same surface as the cam surface of one of the two latch members.

15. A hook according to claim 12, wherein said resilient means is disposed between a projecting portion of one latch member and a projecting portion of the other latch member.

* * * * *